United States Patent

Noé et al.

Patent Number: 5,241,889
Date of Patent: Sep. 7, 1993

[54] ARRANGEMENT FOR CUTTING SHEET METAL

[75] Inventors: Oskar Noé, Mülheim (Ruhr); Wilhelm Schwerdt, Alpen; Dietmar Ulbricht, Hamminkeln, all of Fed. Rep. of Germany

[73] Assignee: BWG Bergwerk-und Walzwerk-Maschinenbau GmbH, Duisburg, Fed. Rep. of Germany

[21] Appl. No.: 810,205

[22] Filed: Dec. 19, 1991

[30] Foreign Application Priority Data

Mar. 13, 1991 [DE] Fed. Rep. of Germany ....... 4108041

[51] Int. Cl.$^5$ .............................................. B26D 5/04
[52] U.S. Cl. ......................................... 83/641; 83/368; 83/694; 83/700
[58] Field of Search ................. 83/700, 694, 697, 641, 83/368

[56] References Cited

U.S. PATENT DOCUMENTS

| | | |
|---|---|---|
| 2,374,625 | 4/1945 | Slettengren ................... 83/700 X |
| 2,525,540 | 10/1950 | Dehn ................................ 83/700 X |
| 3,413,882 | 12/1968 | Richmond et al. ............. 83/700 X |
| 3,791,248 | 2/1974 | Pearson .......................... 83/700 X |
| 3,799,022 | 3/1974 | Nagel et al. .................... 83/694 X |
| 4,050,338 | 9/1977 | Pearson ............................... 83/641 |
| 4,674,378 | 6/1987 | Kawano et al. ..................... 83/368 |

Primary Examiner—Frank T. Yost
Assistant Examiner—Rinaldi Rada
Attorney, Agent, or Firm—Anderson Kill Olick & Oshinsky

[57] ABSTRACT

An arrangement for cutting sheet metal, particularly sheet metal strips. The arrangement includes a double cutting tool with two outer knives and an inner knife which is movable between the outer knives so as to form two cutting gaps. The outer knives are adjustable relative to each other by adjusting wedges in order to adjust the cutting gaps such that the two outer knives are adjusted by the adjusting wedges synchronously or asynchronously by either the same or a different extent. The two outer knives can be clamped against the adjusting wedges.

15 Claims, 3 Drawing Sheets

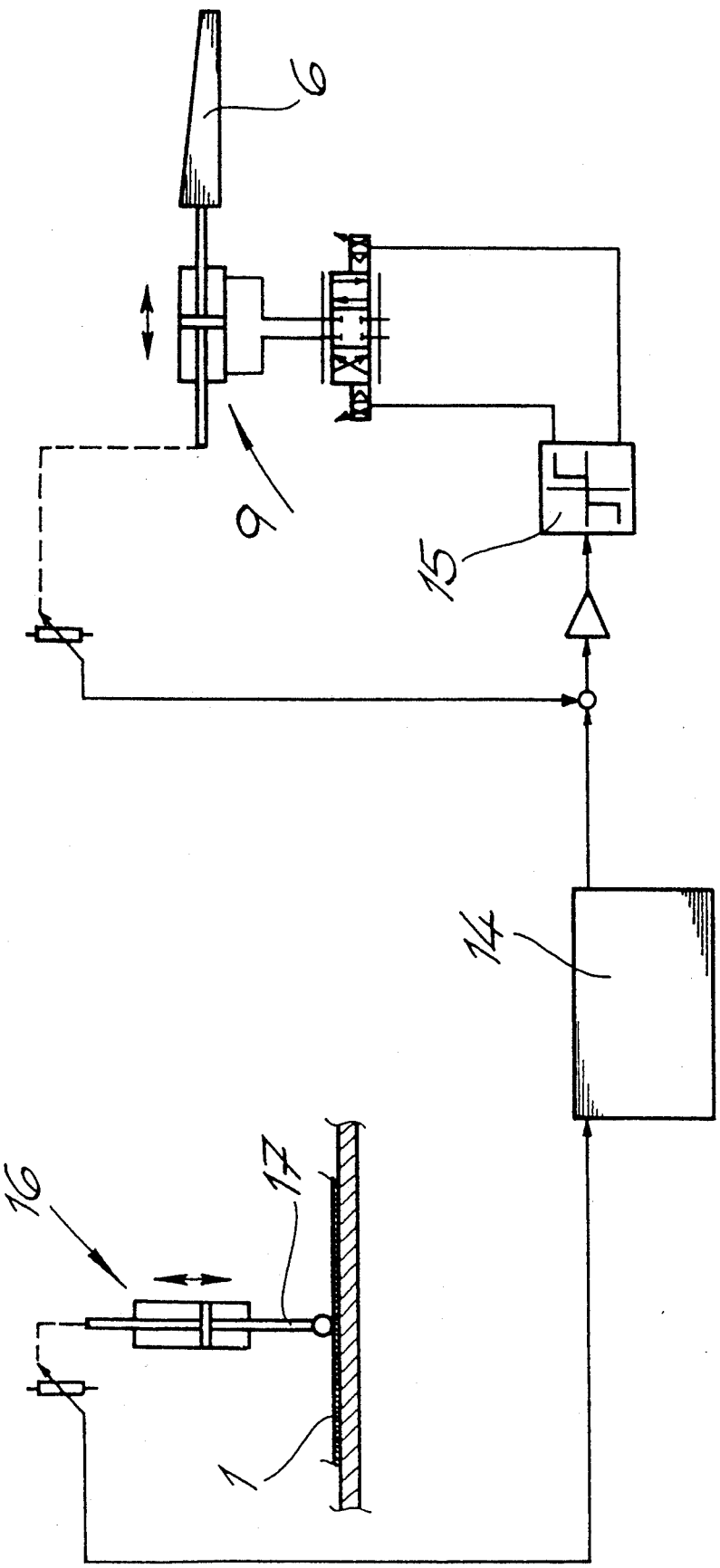

1

ARRANGEMENT FOR CUTTING SHEET METAL

BACKGROUND OF THE INVENTION

Field of the Invention

The present invention relates to an arrangement for cutting sheet metal and particularly for cutting sheet metal strips.

Description of the Related Art

When cutting sheet metal and particularly sheet metal strips, very exact cuts with straight edges are frequently required. This is true, for example, when butt-welding sheet metal plates or the ends of metal strips to be connected by means of a laser beam. In such cases, the joint gap usually may not exceed 0.1 mm. When the material thicknesses and material qualities differ substantially, the cutting gap must be carried out differently in order to obtain favorable results with respect to cutting quality and service life of the cutting knives. Also desired are a reduction of reassembly periods and/or a limitation of the investment costs when using exchange tools with cutting gaps having different widths.

SUMMARY OF THE INVENTION

Therefore, it is the object of the present invention to provide a cutting arrangement of the above-described type which ensures exact cuts with straight edges and a simple and quick cutting gap adjustment, while being of compact and operationally efficient construction.

In accordance with the present invention, an arrangement for cutting sheet metal and particularly sheet metal strips of the above-described type includes a double cutting tool with two outer knives and an inner knife which is movable between the outer knives so as to form two cutting gaps. The outer knives are adjustable relative to each other by means of adjusting wedges in order to adjust the cutting gaps in such a way that the two outer knives can be adjusted by means of the adjusting wedges synchronously or asynchronously by either the same or a different extent, and the two outer knives can be clamped against the adjusting wedges.

In accordance with an advantageous and important feature of the present invention, the outer knives are themselves wedge-shaped.

However, in accordance with another preferred embodiment of the invention, the two adjusting wedges are arranged as intermediate wedges between wedge-shaped abutments and the outer knives and form plane and parallel sliding surfaces with the outer knives.

The adjusting wedges may be horizontal wedges or vertical wedges. Thus, it is within the scope of the invention if the double cutting tool includes an upper knife and two lower knives or a lower knife and two upper knives.

In accordance with another advantageous feature, the adjusting wedges are connected to a common adjusting drive. For example, the adjusting wedges may be mounted on both sides of a T-shaped bearing head of an adjusting rod, such as a piston rod, a threaded spindle or the like. This is because practically all known actuating devices, for example, hydraulic cylinders, driven threaded spindle, etc. are suitable as adjusting drives.

The present invention further provides that the outer knives can be clamped against the adjusting wedges by means of clamping devices which extend through the adjusting wedges with a predetermined play. The clamping devices are only temporarily separated for adjusting the cutting gaps. The clamping devices can be arranged in the wedge-shaped abutments, wherein the adjusting wedges or intermediate wedges have oblong holes for providing the predetermined play of the clamping devices which extend through the wedges, for example, for piston rods of cylinder-piston arrangements which are attached to the outer knives. Several clamping devices which are distributed over the length of the knives are preferably arranged for each outer knife, in order to obtain as uniform as possible a clamping of the outer knives against the adjusting wedges.

In accordance with a proposal of the invention with independent significance, the adjusting drive includes an electronic means for determining the adjustment distance of the outer knives and is coupled to a measuring device for measuring the thickness of the sheet metal, wherein at least a computer and a regulator are arranged between the adjusting drive and the measuring device, wherein the adjusting drive automatically adjusts the cutting gaps for the sheet metal thickness determined in each instance. The measuring device for the thickness of the sheet metal is advantageously mounted in a holding-down member for the sheet metal or sheet metal strips. Thus, after a sheet metal has been put in place, initially the already existing holding-down members are moved against the sheet metal. The sheet metal thickness in one of the holding-down members determined by means of the measuring device is electronically computed in order to determine the adjustment distances. The regulator then carries out the actuation of the adjusting drives and, consequently, the automatic adjustment of the cutting gaps. For this purpose, the adjusting wedges are moved until the required cutting gaps of, for example, 5% of the sheet metal thickness is reached. At this time, the outer knives are not clamped. After the adjustment of the cutting gaps, the outer knives and the adjusting wedges are clamped, so that the double cut can be initiated, for example, by means of a pressure switch in a circuit for the clamping pressure.

In addition to cylinder-piston arrangements, the clamping devices for the outer knives may also be spring systems, threads or additional wedges. However, preferably used are hydraulic cylinders or cylinder-piston arrangements. However, during the adjustment of the outer knives, the pressure in the hydraulic cylinders is only reduced to such an extent that the sliding surfaces between the outer knives and the adjusting wedges remain closed and the penetration of dirt is avoided.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWING

In the drawing:

FIG. 4 is schematic illustration of the adjusting device for the adjusting wedges.

DESCRIPTION OF THE PREFERRED EMBODIMENT

Figure 1:
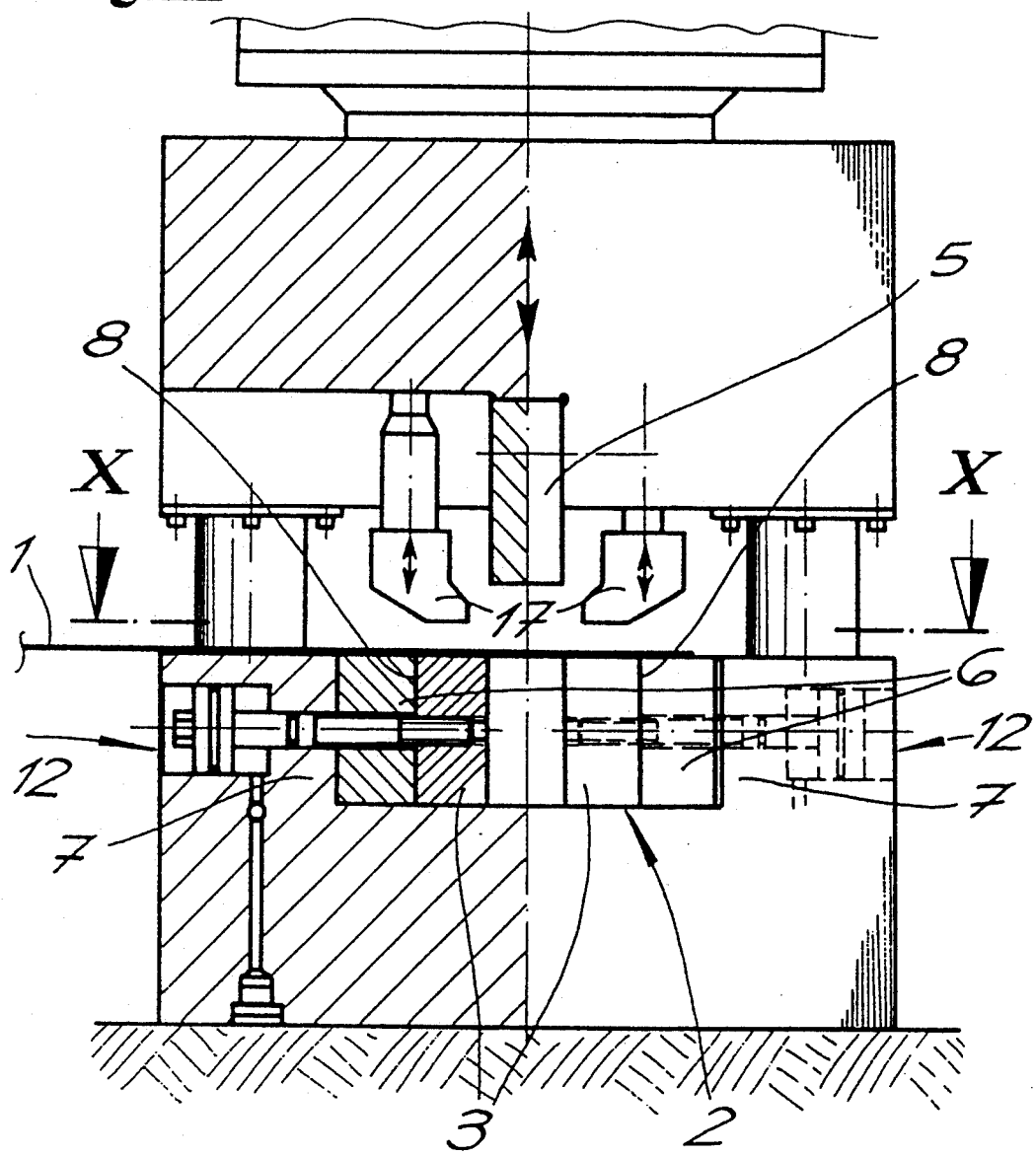
FIG. 1 is an elevational view, partially in vertical section, of the cutting arrangement according to the present invention.
Figure 2:
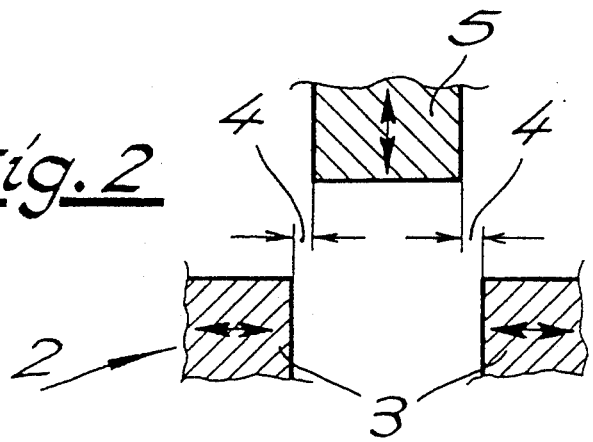
FIG. 2 shows, on a larger scale, a detail of the cutting arrangement of FIG. 1 in the region of the cutting knives.

FIG. 1 of the drawing shows an arrangement for cutting sheet metal and particularly sheet metal strips 1. The cutting arrangement includes a double cutting tool 2 with two outer knives 3 and an inner knife 5 which can be moved between the two outer knives 3 so as to form two cutting gaps 4, as shown in detail in FIG. 2.

Figure 3:
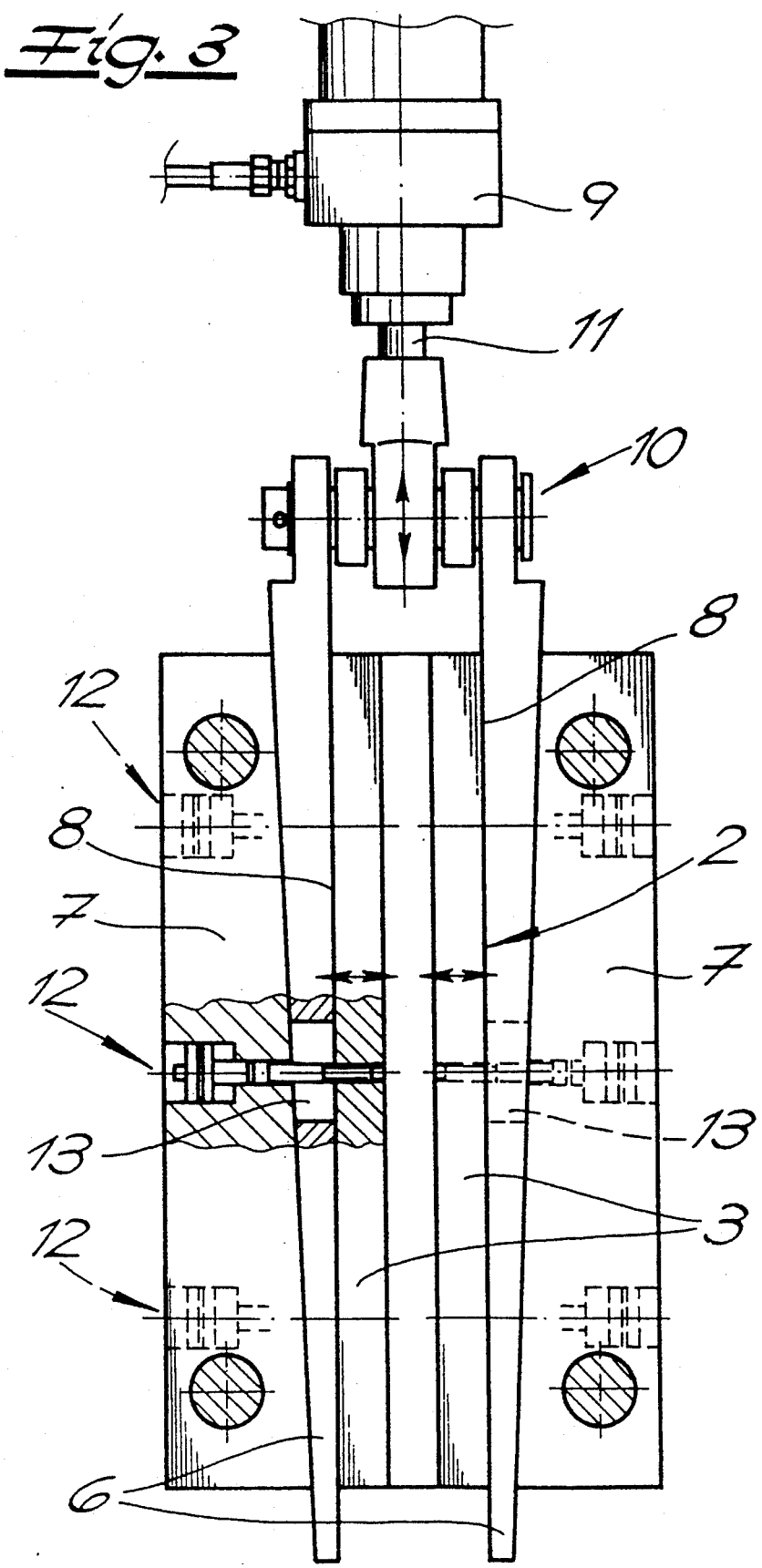
FIG. 3 is a horizontal sectional view along sectional line X—X of FIG. 1.

As shown in FIGS. 1 and 3, the outer knives 3 can be adjusted relative to each other by means of adjusting wedges 6 for adjusting the cutting gaps 4. In the illustrated embodiment, the two outer knives 3 can be synchronously adjusted by the same extent by means of the adjusting wedges 6. After the adjustment, the knives are clampable against the adjusting wedges 6. The two adjusting wedges 6 are intermediate wedges and are arranged between wedge-shaped abutments 7 and the outer knives 3. Together with the outer knives 3, the adjusting wedges form plane and parallel sliding surfaces 8. In the illustrated embodiment, the adjusting wedges 6 are horizontal wedges.

The adjusting wedges 6 are connected to a common adjusting drive 9. For example, the adjusting wedges 6 are connected on both sides of a T-shaped bearing head 10 of an adjusting rod 11 of the adjusting drive 9. In the illustrated embodiment, the adjusting rod 11 is a piston rod of an adjusting cylinder. The outer knives 3 can be clamped against the adjusting wedges 6 by means of clamping devices 12 which extend with predetermined play through the adjusting wedges 6. The clamping devices 12 are arranged in the wedge-shaped abutments 7. For forming the predetermined play, the adjusting wedges or intermediate wedges 6 have oblong holes 13 through which the clamping devices 12 can penetrate. In the illustrated embodiment, the clamping devices 12 are piston rods of cylinder-piston arrangements which are attached to the outer knives 3. Several clamping devices 12 distributed over the length of the knives are provided for each outer knife 3.

As schematically illustrated in FIG. 4, the adjusting drive 9 includes an electronic means for determining the adjustment distance of the outer knife 3 and is coupled to a measuring device 16 for the thickness of the sheet metal, with at least a computer 14 and a regulator 15 being arranged between the measuring device 16 and the adjusting drive 9. The adjusting drive 9 automatically adjusts the cutting gaps 4 for the respectively determined sheet metal thickness. The measuring device 16 is mounted in an already existing holding-down member 17 for the respective sheet metal or sheet metal strip 1.

While a specific embodiment of the invention has been shown and described in detail to illustrate the application of the inventive principles, it will be understood that the invention may be embodied otherwise without departing from such principles.

We claim:

1. An arrangement for cutting sheet metal, particularly sheet metal strips, comprising:
    a double cutting tool having two outer knives defining a space therebetween;
    an inner knife movable in and out of the space between the outer knives to form two cutting gaps;
    adjusting wedges for displacing the outer knives relative to each other for adjusting the cutting gaps, the two outer knives being displaceable synchronously or asynchronously by the same extent;
    wedge-shaped abutments arranged on sides of the adjustment wedges, respectively, which are remote from the outer knives; and
    means for clamping the two outer knives against the adjusting wedges;
    wherein the clamping means comprises cylinder/piston arrangements located in the wedge-shaped abutments, wherein said adjusting wedges have elongated holes for forming a predetermined clearance for play and the cylinder/piston arrangements have piston rods extending through the elongated holes in the adjusting wedges and anchored in the outer knives for displacing same.

2. The arrangement of claim 1, wherein the adjusting wedges and respective outer knives have contact surfaces extending parallel to each other and sliding relative to each other.

3. The arrangement of claim 1, wherein the cylinder/piston arrangements include a plurality of cylinder/piston arrangements for each outer knife arranged along the length of each outer knife.

4. The arrangement of claim 1, further comprising:
    a measuring device for measuring the thickness of the sheet metal; and
    means for automatically adjusting the cutting gaps in accordance with the sheet metal thickness determined by the measuring device, the automatically adjusting means including:
    a computer and a regulator arranged between the adjusting drive and the measuring device for controlling operation of the adjusting drive; and
    means arranged between the regulator and the adjusting drive for controlling operation of the adjusting drive.

5. The arrangement of claim 4, wherein the measuring device is mounted in a holding-down member for the sheet metal.

6. The arrangement of claim 1, wherein the adjusting wedges are horizontally extending wedges.

7. The arrangement according to claim 1, wherein the adjusting wedges are connected to a common adjusting drive.

8. The arrangement according to claim 7, wherein the adjusting drive comprises an adjusting rod with a T-shaped bearing head, the adjusting wedges being attached to both sides of the bearing head.

9. The arrangement according to claim 8, wherein the adjusting rod is a piston rod.

10. An arrangement for cutting metal, particularly sheet metal strips comprising:
    a double cutting tool having two outer knives defining a space therebetween;
    an inner knife movable in and out of the space between the outer knives to form two cutting gaps;
    adjusting wedges for displacing the outer knives relative to each other for adjusting the cutting gaps, the two outer knives being displaceable synchronously or asynchronously by the same extent; and
    means for clamping the two outer knives against the adjusting wedges, the clamping means comprising clamping elements extending with a predetermined play through the adjusting wedges.

11. The arrangement of claim 10, further comprising wedge-shaped abutments arranged on sides of the adjusting wedges, respectively, which are remote from the outer knives.

12. The arrangement of claim 10, wherein the clamping means comprises cylinder/piston arrangements, the clamping elements being formed by piston rods of the cylinder/piston arrangements, with the piston rods being attached to the outer knives.

13. The arrangement of claim 10, wherein the clamping elements include a plurality of clamping elements for each other knife arranged along the length of each outer knife.

14. The arrangement of claim 10, further comprising:
an adjusting drive connected to the adjusting wedges;
a measuring device for measuring the thickness of the sheet metal; and
means for automatically adjusting the cutting gaps in accordance with the sheet metal thickness determined by the measuring device, the automatically adjusting means including:
a computer and a regulator arranged between the adjusting drive and the measuring device for controlling operation of the adjusting drive, and
means arranged between the regulator and the adjusting drive for controlling operation of the adjusting drive.

15. The arrangement of claim 14, wherein the measuring device is mounted in a holding-down member for the sheet metal.

* * * * *